United States Patent
Persson et al.

(10) Patent No.: US 9,423,506 B2
(45) Date of Patent: Aug. 23, 2016

(54) TACTICAL DIFFERENTIAL GPS

(75) Inventors: Per-Olof Persson, Karlskoga (SE); Rolf Michel, Karlskoga (SE)

(73) Assignee: SAAB AB, Linköping (SE)

( * ) Notice: Subject to any disclaimer, the term of this patent is extended or adjusted under 35 U.S.C. 154(b) by 27 days.

(21) Appl. No.: 14/345,613

(22) PCT Filed: Sep. 16, 2011

(86) PCT No.: PCT/SE2011/000162
§ 371 (c)(1),
(2), (4) Date: Oct. 9, 2014

(87) PCT Pub. No.: WO2014/081351
PCT Pub. Date: May 30, 2014

(65) Prior Publication Data
US 2015/0051827 A1    Feb. 19, 2015

(51) Int. Cl.
*G01C 21/30* (2006.01)
*G01S 19/40* (2010.01)

(52) U.S. Cl.
CPC ............... *G01S 19/40* (2013.01); *G01C 21/30* (2013.01)

(58) Field of Classification Search
CPC ....... G01C 21/30; G01S 19/40; G01S 19/05; G01S 5/14
USPC ....... 701/446, 469, 473; 352/357.02, 357.42, 352/357.71
See application file for complete search history.

(56) References Cited

U.S. PATENT DOCUMENTS 5,422,639 A * 6/1995 Kobayashi et al. .......... 340/988
5,995,023 A * 11/1999 Kreft ...................... 340/995.25
7,974,781 B2 * 7/2011 Emoto et al. ................ 701/436
8,326,530 B2 * 12/2012 Asai et al. .................... 701/438
2002/0038181 A1 * 3/2002 Okude et al. ................ 701/208

(Continued)

FOREIGN PATENT DOCUMENTS

JP    2002148064 A    5/2002
JP    2004233169 A    8/2004

(Continued)

OTHER PUBLICATIONS

PCT/ISA/210—International Search Report—June 14, 2012 (Issued in Application No. PCT/SE2011/000162).

(Continued)

*Primary Examiner* — Tan Q Nguyen
(74) *Attorney, Agent, or Firm* — Venable LLP; Jeffri A. Kaminski

(57) ABSTRACT

A method for improving an accuracy of a radio based navigation system by correcting the position given by the radio based navigation system with a correction vector derived from localization data stored in a map database. Position coordinates of the radio based navigation system are measured. A set of 3D map data is selected based upon the measured position coordinates of the radio based navigation system position coordinates. The actual position is determined from the selected 3D map data. The actual position data coordinates are retrieved from the 3D map data based upon the determined actual position. The correction vector is calculated from position difference between measured radio based navigation system position coordinates and retrieved actual position coordinates. The position given by the radio based navigation system is corrected with the correction vector.

7 Claims, 3 Drawing Sheets

(56) References Cited

U.S. PATENT DOCUMENTS

| | | |
|---|---|---|
| 2009/0005977 A1 | 1/2009 | Chung et al. |
| 2010/0176987 A1 | 7/2010 | Hoshizaki |
| 2011/0054783 A1* | 3/2011 | Kishikawa et al. .......... 701/209 |

FOREIGN PATENT DOCUMENTS

| | | |
|---|---|---|
| JP | 2007142517 A | 6/2007 |
| JP | 2010006575 A | 1/2010 |
| WO | WO-00/50917 A1 | 8/2000 |
| WO | WO-2005/038402 A1 | 4/2005 |
| WO | WO-2008/118578 A2 | 10/2008 |
| WO | WO-2009/098154 A1 | 8/2009 |

OTHER PUBLICATIONS

PCT/ISA/237—Written Opinion of the International Searching Authority—June 14, 2012 (Issued in Application No. PCT/SE2011/000162).

Supplementary European Search Report in European Patent Application No. EP11879202, dated Jun. 25, 2015.

* cited by examiner

TACTICAL DIFFERENTIAL GPS

TECHNICAL FIELD

The present invention relates to a method for improving the accuracy of a radio based navigation system by correcting the position given by the said radio based navigation system with a correction vector derived from localization data stored in a map database.

BACKGROUND ART

There exists several different radio based navigation systems of which the GPS system is the most well known. GPS is an abbreviation of Global Positioning System and is a global covering and from satellite transmitted radio based navigation system. The GPS system provides high accuracy and has in principle two accuracy classes where full accuracy only is available for the military GPS. The accuracy is restricted for civilian use where techniques such as differential GPS is developed to improve the accuracy. Differential GPS provides improved location accuracy compared to ordinary GPS by using radio signals from a network of fixed ground base reference stations with a known position. The information transmitted from the ground base reference stations is the difference between the measured satellite distance (pseudorange) and the actual distance. The receiver of the signal from the ground based reference stations may correct their measured distances (pseudoranges) by the correction factor defined in the signal transmitted from the ground based reference stations.

It is also known that combining the radio based positioning system with a dead-reckoning or inertial based navigation system could improve the accuracy of the radio based systems at occasions where the radio based navigation systems received radio signal is expected to be unavailable or distorted.

It is also known that a map or a database with position information could be used to improve the accuracy of the position received by a GPS system. The invention published in patent document WO00/50917 discloses a navigation system for a vehicle for correcting the intermittent absence of the GPS signal and correction of the GPS errors with navigation information from other system. The specified other systems are dead-reckoning such as velocity of the vehicle and a map with position information. Correction of the accuracy of the GPS position is made when the vehicle is moving at a junction, such as a turning point or crossing, where the position in the map is identified and a correction is made to the, by the GPS receiver, received position.

Problem with the solution described in WO00/50917 for improved navigation accuracy is the difficulty to identify the map location that is used to correct the position received by the GPS receiver.

Accordingly, it is an object of the invention to provide a reliable and improved method to correct the received position.

Other problems solved by the invention are described in the detailed description,

SUMMARY OF THE INVENTION

One object of the new invention is to eliminate drawbacks associated with the solutions known in the prior art.

Another object is to provide a method for improving the accuracy of a radio based navigation system by 3D map data.

The new invention describes a method for improving the accuracy of a radio based navigation system by correcting the position given by the said radio based navigation system with a correction vector derived from localization data stored in a map database, where the correction, vector is calculated by;

(a) measuring the position coordinates of the radio based navigation system, (b) selecting based upon the measured position coordinates of the radio based navigation system position coordinates a set of 3D map data, (c) determining from the selected 3D map data the actual position, (d) retrieving based upon the determined actual position the actual position data coordinates from the 3D map data, (e) calculating the correction vector from position difference between measured radio based navigation system position coordinates and retrieved actual position coordinates (f) correcting the position given by the radio based navigation system with the correction vector.

Furthermore the improved method for improving the accuracy of a radio based navigation, system according to the invention discloses; that the actual position is determined by;

(a) displaying the 3D map data as a 3D map on a display, (b) selecting actual position on the displayed 3D map.

that the actual position on the displayed map is selected by marking the position on the display.

that the actual position is determined by selecting the actual position with the 3D map data and an automatic input device recognizing the actual position.

that the automatic input device is a computer vision system comprising an image sensor and image processing functionality.

that the radio based navigation system is a GPS receiver.

that the 3D map is created by Rapid 3D Mapping, Where Rapid 3D Mapping is a method for creating 3D map data and 3D maps.

BRIEF DESCRIPTION OF THE DRAWINGS

The invention will be described in greater detail below by way of illustration of embodiments and with reference to the attached drawings, in which.

DETAILED DESCRIPTION

Figure 1:
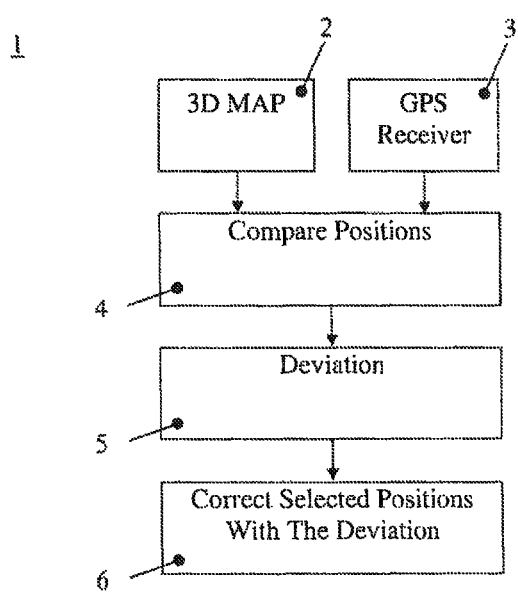
FIG. 1 shows a schematic view of the method for improving the accuracy of a radio based navigation system in accordance with the present invention.

A schematic diagram of the method for improving the accuracy of a radio based navigation system is shown in FIG. 1. A Compare Positions block 4 receives input signals from a database containing information for 3D Maps 2 and a navigation signal from a GPS Receiver 3. The navigation signal could also be provided by other radio based navigation systems. A method to make 3D maps is described in the patent application WO2011/093752. A method and technology suitable for creating a 3D map is called Rapid 3D Mapping™. The 3D map data contains position information for an area where the position coordinates for the 3D map is a combination of localization information of position and altitude together with a visual component. The visual component for visualization of a surface could be a part of a photo of the visualized surroundings or a coloured area. One of several known formats for representing 3D surfaces are TIN, Triangulated Irregular Network, that is a vector based representation of a physical surface composed of three-dimensional coordinates that are arranged in a network of non overlapping triangles. The navigation signal could be any radio based positioning system but in a preferred embodiment a GPS Receiver 3 is selected. In the Compare Positions block 4 a comparison between the previously measured 3D map information from the 3D Map block 2 and the received positioning signal from the GPS Receiver block 3 is performed. The result from the Deviation 5 block is the calculated deviation between the previously measured 3D map positioning coordinates and the, by the GPS Receiver 3, measured coordinates. The output from the Deviation block 5 is a correction vector containing the error between the received and actual position. The correction vector is used to correct the measures coordinates in the block Correct Selected Positions With The Deviation 6.

Figure 2:
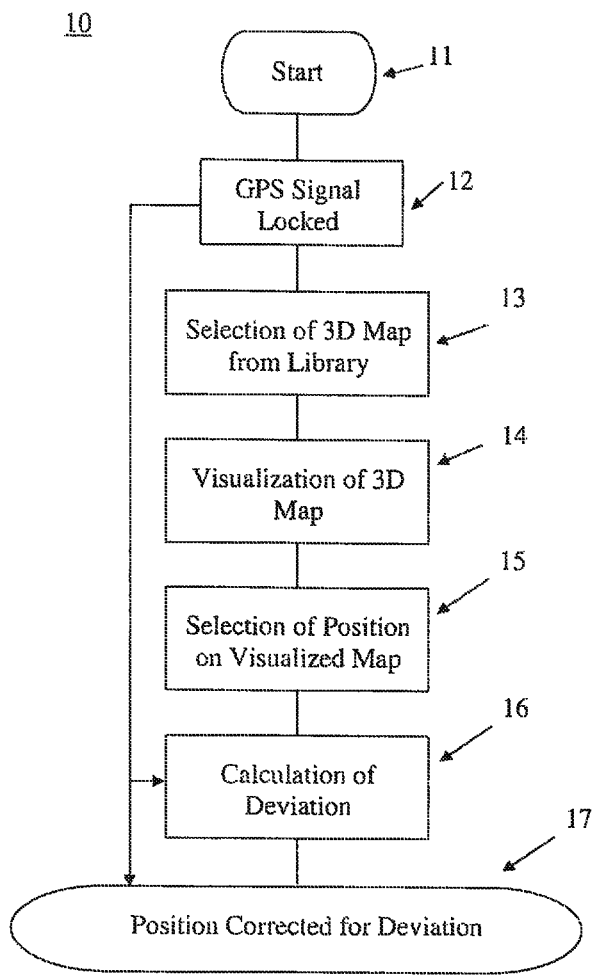
FIG. 2 shows a flowchart for the method for improving the accuracy of a radio based navigation system in accordance with the present invention.

For achieving higher accuracy of the received position a correction vector is created. In a first step for creating a correction vector the. radio based navigation systems received position is used to retrieve or in another way fetch a 3D map from a 3D map database. The fetched 3D map is visualized, for example on a touch screen, and the position of the antenna is defined on the touch screen. There could also be other methods of coordinate or unite the measured position from the GPS receiver with the marked position on the 3D map. Methods for coordination could be image, processing, signal processing, electric beacon or other means to select a position in the 3D map database. A flowchart 10 for calculating current position with correction for deviation is illustrated in FIG. 2. The initiation or Start 11 of calculation of a correction vector begins with that the GPS Receiver 3 locks on a signal and a GPS Signal Locked 12 is achieved. When the GPS Signal is locked the current position is estimated with an error in the range of 0-20 m. The estimated position is used to select the proper 3D map in the block Selection of 3D Map from Library 13. Stored in the navigation unit are information and data for a number of 3D maps. The information and data could he stored in the navigation unit or downloaded to or in other way transferred to the navigation unit. With the locked GPS Signal the accuracy is good enough to sort out and display a 3D map of the current position. This is accomplished in the Visualization of 3D Map 14 block. The visualized map, preferably visualized on some form of display or screen, gives the operator an overview of the current location and the operator have the possibility to identify that the visualized map is a map of the actual terrain. The operator interacts with the navigation unit to select the proper location of the GPS Receiver in the Selection of Position on Visualized Map 15. With the operator selected position and the signal from the GPS Receiver the deviation as a collection vector is calculated in the Calculation of Deviation block 16. The correction vector calculated from the Calculation of Deviation 16 block estimates the error and could be used with the received signal from the GPS receiver to dynamically adjust the GPS signal to get a Position Corrected for Deviation 17. If needed the deviation, error could be recalculated at predefined or random intervals.

Figure 3:
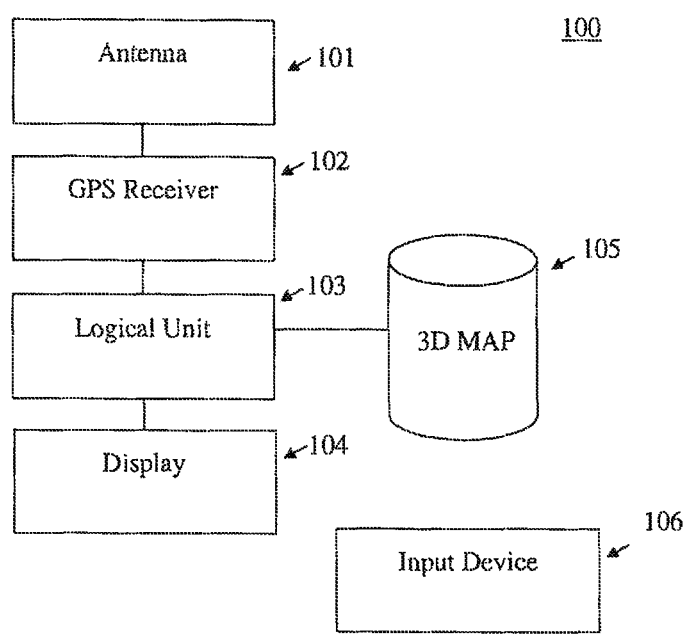
FIG. 3 shows a schematic view of the navigation system, in accordance with the present invention.

A schematic view of the navigation system 100 is shown in FIG. 3. The navigation system is composed of a GPS Receiver 102 electrically connected to an Antenna 101. The electromagnetic navigations signals from one or several navigation satellites, not shown in the figure, are received by the Antenna 101 and transferred to the GPS Receiver 102. The GPS Receiver 102 receives and decodes the navigation signals and calculates a position that is transferred to the Logical Unit 103. The Logical Unit 103 uploads or in other way fetches 3D map information, from a 3D MAP database 105, for the from the GPS Receiver 102 received position. The 3D MAP database 105 contains 3D map information for the area or zone where the navigation system is used or is intended to be used. The 3D map is presented on the Display 104 together with the measured GPS position. An Input Device 106 is used for indicating the actual and/or experienced position as viewed on the Display 104. The Input Device 106 could be a mouse, keyboard or other device for manoeuvring a cursor on the Display 104. The Input Device 106 could also be a touch screen where the position is marked by pressing the Display 104. An automatic and autonomous navigation system 100 could have an optical, electro optical, or electromagnetic Input Device 106. In the case an automatic device is used the Display 104 is not needed.

Alternative Embodiments

The invention is not limited to the shown embodiments. The invention could be varied regarding to the number of elements, size, material, arid form factor within the scope of the patent claims.

It is obvious that the presented new invention could be used for all kinds of navigation systems, for all types of vehicles and ships, including airships, spaceships, and sea ships and on land vehicles.

The invention claimed is:

1. A method for improving an accuracy of a radio based navigation system by correcting a position given by the radio based navigation system with a correction vector, the method comprising:
    measuring position coordinates of the radio based navigation system,
    selecting based upon the measured position coordinates of the radio based navigation system position coordinates a set of 3D map data,
    determining from the selected 3D map data an actual position,
    retrieving based upon the determined actual position actual position data coordinates from the 3D map data,
    calculating the correction vector from position difference between measured radio based navigation system position coordinates and retrieved actual position coordinates, wherein the correction vector is derived from localization data stored in a map database, and
    correcting the position given by the radio based navigation system with the correction vector.

2. The method for improving the accuracy of a radio based navigation system according to claim 1, wherein determining the actual position comprises:
    displaying the 3D map data as a 3D map on a display, and selecting actual position on the displayed 3D map.

3. The method for improving the accuracy of a radio based navigation system according to claim 2, wherein the actual position on the displayed map is selected by marking the position on the display.

4. The method for improving the accuracy of a radio based navigation system according to claim 1, wherein the actual position is determined by selecting the actual position with the 3D map data and an automatic input device recognizing the actual position.

5. The method for improving the accuracy of a radio based navigation system according to claim 4, wherein the automatic input device is a computer vision system comprising an image sensor and image processing functionality.

6. The method for improving the accuracy of a radio based navigation system according to claim 1, wherein the radio based navigation system is a GPS receiver.

7. The method for improving the accuracy of a radio based navigation system according to claim 1, wherein the 3D map is created by Rapid 3D Mapping.

* * * * *